Figure 1:
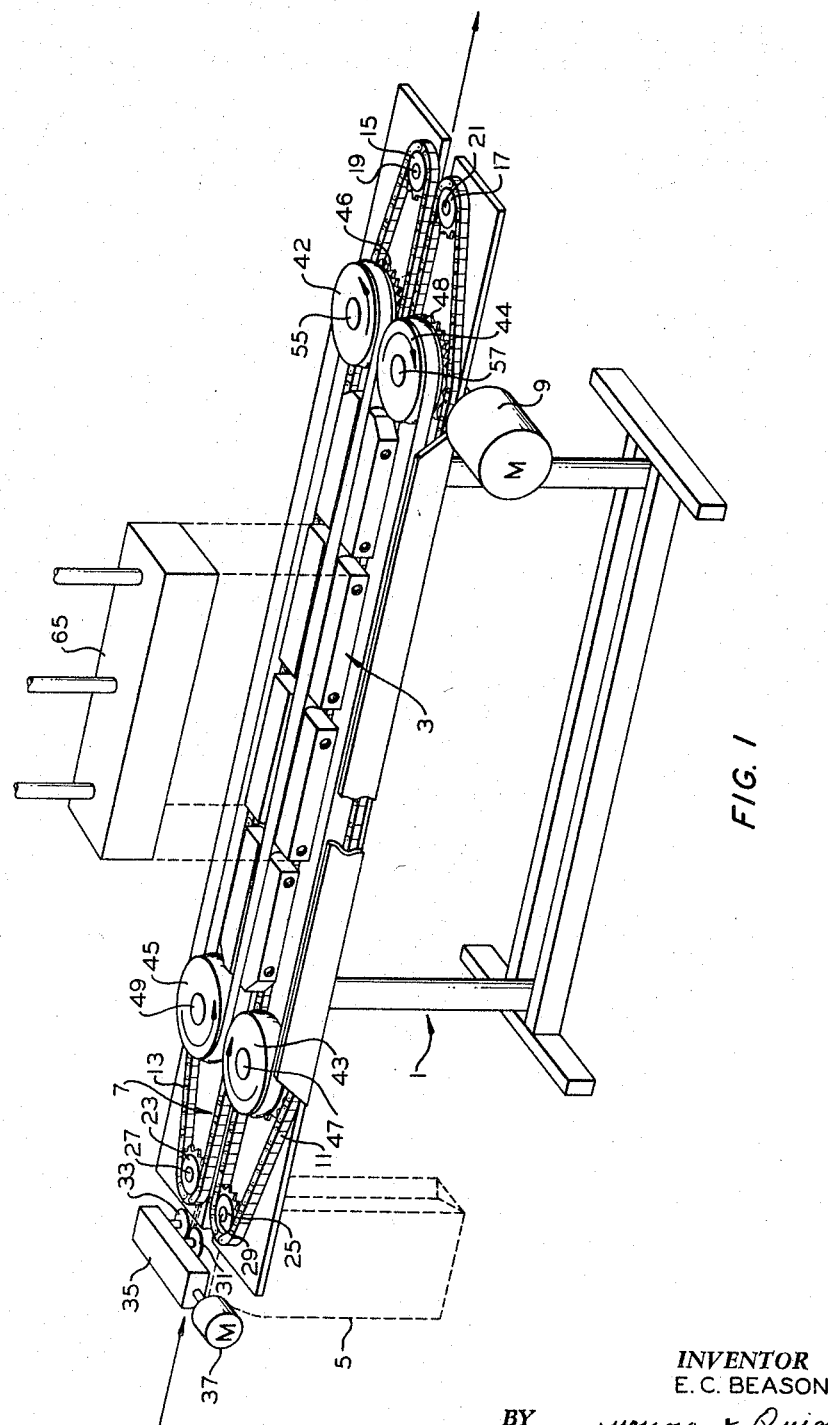

INVENTOR
E. C. BEASON
BY young + Quigg
ATTORNEYS

INVENTOR
E.C. BEASON
BY Young + Quigg
ATTORNEYS

United States Patent Office 3,326,735
Patented June 20, 1967

3,326,735
CONTINUOUS SEALING OF BIAXIAL ORIENTED FILM
Elmer C. Beason, Jr., Bartlesville, Okla., assignor to Phillips Petroleum Company, a corporation of Delaware
Filed Nov. 30, 1964, Ser. No. 414,820
10 Claims. (Cl. 156—272)

This invention relates to an improved heat sealing machine of the type known in the trade as a "continuous band sealer." In one aspect this invention relates to a process for the continuous sealing of biaxial oriented film strips which have a relatively sharp melting point and a low heat conductivity. In another aspect this invention relates to a method for continually sealing the ends of a plurality of thermoplastic bags wherein they are passed through an area across which a predetermined temperature gradient has been established. In yet another aspect, this invention relates to novel apparatus for establishing the requisite temperature gradient across the film to be sealed.

Recently heavy gauge polyolefin films have become very important in the industrial field. However, in many cases there has been a great deal of difficulty in obtaining a strong heat sealed joint between two or more layers of biaxial oriented film. In sealing the film, the greater part of the orientation is lost because the film is not subject to a temperature gradient over which it is cooled and, as a result, the material in the seal is weaker than the material of the film itself. One notable application for such a film is in manufacturing heavy gauge polyethylene shipping bags. These bags are air tight, water impervious, and can be stored out of doors and in general perform better than those prior art bags composed of conventional paper, textile construction, or the like. The problem with these biaxial oriented polyethylene films is that no satisfactory seal could be made in the bottom and top of the bag in order that the seal would be as strong as the material in the bag itself. As a result, the film thickness had to be increased beyond that which was actually necessary solely to assure that the top and bottom seals would be sufficiently strong. This, of course, raised raw material and production costs.

Previous methods of sealing plastic film relied on fusing two superimposed sheets together by heat, with or without pressure, in a single operation. One disadvantage of this method is that the sealed area lost most of the molecular orientation and the resulting strength that had been attained during the extrusion process. The object of most film extrusion processes is to orient molecules of the plastic film to bring about the best physical properties. In sealing the film, the greater part of the orientation was lost because the film was not subjected to a temperature gradient during the heating and cooling operations. As a result, the material in the seal was weaker than the material of the film itself. Another disadvantage of these prior art methods is that the thermoplastic material, when it is heated to fusion temperature, cannot support the pressure of the heated sealing surfaces without flowing and consequently thinning down to some extent.

It is an object of this invention to provide improvements in methods and mechanisms for conveying a plurality of polyolefin bags, in which the plastic film has been biaxially oriented, through an area in which a predetermined heat transfer gradient is established, wherein the bag ends are trimmed to provide uniform edges which are molded and subsequently cooled to form a transverse heat seal across the top of the bags.

Another object of this invention is to provide a method for sealing the tops of biaxial oriented polyolefin bags in which a portion of the top is constantly clamped during the heating and cooling operations so as to provide a tension on the film and also to provide an area across the top of the bag over which a temperature gradient is established.

Yet another object of this invention is to provide a bag sealing machine for continuous sealing of bags made from biaxial oriented films, which comprises, in combination, a conveyor for transporting bags in a generally horizontal plane with the top edges of the respective bags being uppermost and in closed relation with each other, a heater disposed along the path of movement of the bags and in spaced relation to the uppermost extremity of the tops thereof for melting the material in a marginal transverse area across the respective bag tops, and cooling means engaging the bag tops in a predetermined inwardly spaced relation relative to the uppermost edges of the bags, in order to limit the area of the material melted and to provide therein a transverse seal which is as strong as the original biaxial oriented material.

A still further object of this invention is to provide a rapid and economical method for forming strong seal in heavy gauge bioriented plastic bags.

Yet another object of this invention is to provide an improved band in a machine of the type described wherein the band contributes greatly to the improved results.

Figure 2:
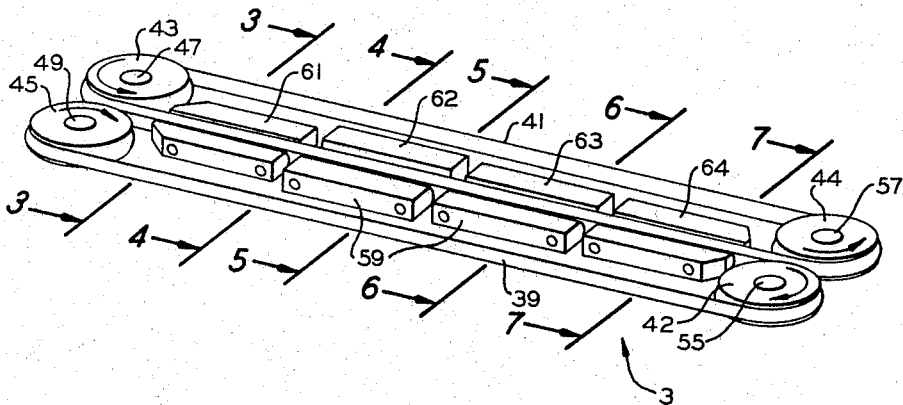
Figures 3, 4, 5, 6, 7:
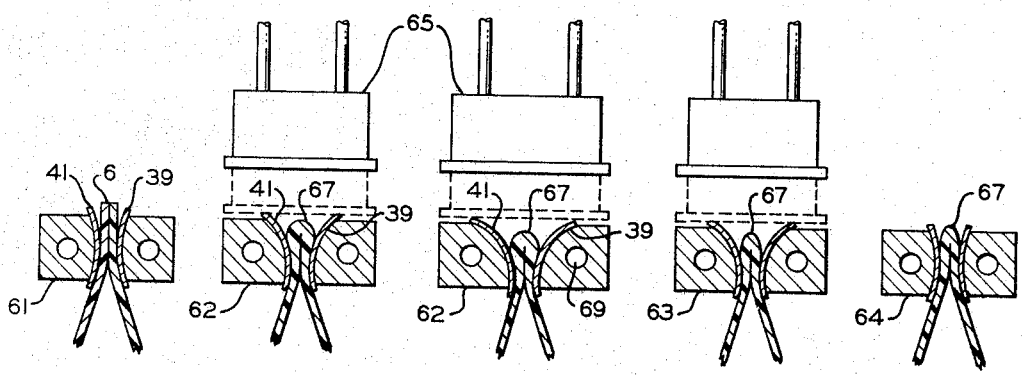
Figure 8:
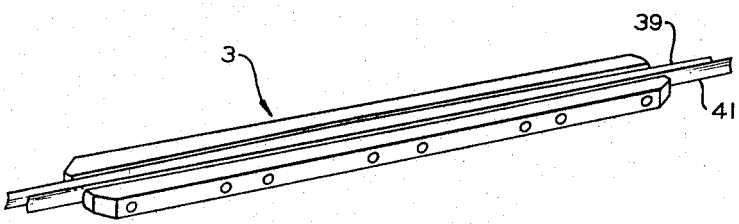
Figure 9:
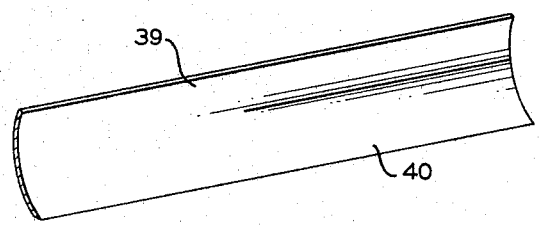
Figure 10:
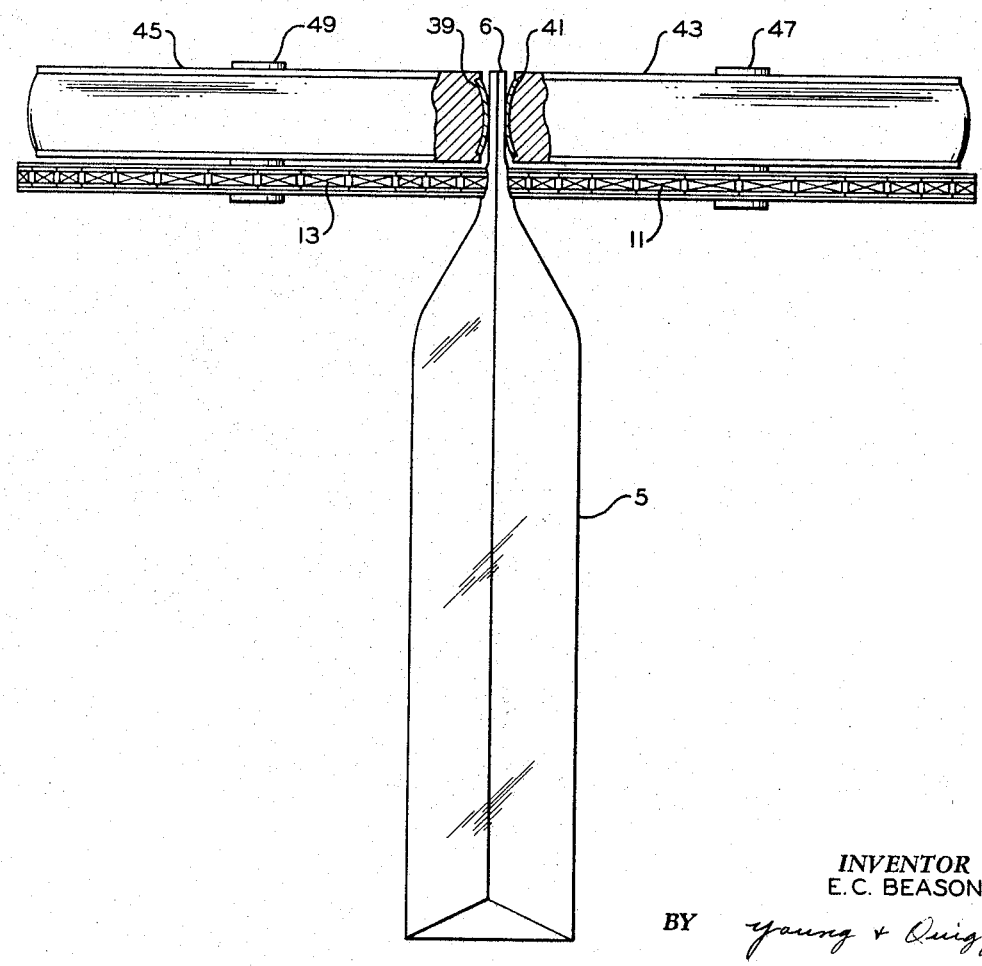

Other objects and many of the attendant advantages of this invention will be readily appreciated as the same becomes better understood by reference to the following detailed description, which is considered in connection with the accompanying drawings wherein:

FIGURE 1 is an axonometric view of the apparatus used;
FIGURE 2 is an axonometric projection of the top of the apparatus of FIGURE 1;
FIGURE 3 is a cross section taken on the line 3—3 of FIGURE 2;
FIGURE 4 is a cross section taken on the line 4—4 of FIGURE 2;
FIGURE 5 is a cross section taken on the line 5—5 of FIGURE 2 and also showing the positioning of the heaters over the apparatus;
FIGURE 6 is a cross section taken on the line 6—6 of FIGURE 2;
FIGURE 7 is a cross section taken on the line 7—7 of FIGURE 2;
FIGURE 8 is an axonometric projection similar to FIGURE 2 showing another embodiment of the invention;
FIGURE 9 is an axonometric view of a section of the curved band;
FIGURE 10 is an end view of the device in FIGURE 1 showing a bag supported therein.

Therefore, according to this invention, there is described a method of forming a seal in the top of bags made of biaxial oriented polyolefin plastic sheet material, comprising placing the top of the bag, which consists of two layers of plastic material capable of being melted at their marginal portions in face-to-face relationship, clamping them together between a series of "pressure bars," directing heat onto the marginal portions to cause a molten bead to build up and unite along the marginal portions whereby the shape of the cross sectional area of the plastic material between the pressure bars is changed gradually enlarging the distance between the outer surfaces of the layers at their tops during the heating operation; permitting cooling fluid to circulate through the "pressure bars"; gradually diminishing the distance between the outer surfaces of the layers during and after the heating operation in order to control the shape and rate of cooling of the melted and heat affected material to form a temperature gradient across the tops of the bags to insure a strong and durable joint.

The term "pressure bar" is used herein to denote those members which support and guide the two bands that are circulating continuously therebetween. These bars are shaped in such a manner that their top surfaces diverge then converge during the heating and cooling of the marginal portions of the material between the bands sufficient to impart to the polyolefin film material a substantial wave-like movement through the apparatus. This shaping of the pressure bars establishes a transition area in the seal whereby the material immediately next to the seal has the greatest cross sectional area and therefore is not weakened below the strength of the original biaxial material. This transition enables the film to pass from a completely unoriented state progressively to the unaltered biaxial oriented state. The curved relationship between the bands permits the seal and the area immediately adjacent to the seal to be thicker in cross section than that part of the film which remains in the unaltered biaxial oriented state. Such a method of sealing, calling for the formation of a transition zone, imparts an increased overall strength to the seals of biaxial oriented thermoplastic material from which the bags described hereinabove are made. The temperature of the pressure bars may be regulated in any desired manner, for example, by providing conduits therein for the passage through the pressure bars of water or other liquid maintained at a predetermined temperature.

Referring to FIGURES 1-7 of the drawings, there is illustrated a method and mechanism incorporating therein the principles of this invention wherein a transverse heat seal is applied to the marginal edges of an end of a bag formation, the bag end being formed of a material, such as for example, biaxial oriented polyethylene film, which material is characterized by its ability when an edge or fold thereif is subjected to radiant heat to melt along the edges or fold and thereafter to cool in a bead-like formation.

The mechanism comprises a base 1 which may be a metal casting formed in a conventional manner. The base 1 supports in depending relation thereon a sealing mechanism 3 which is adapted to operate on bags 5 conveyed beneath the frame 1 by an endless conveyor 7.

The conveyor 7 may be supported in any conventional manner beneath the sealing mechanism 3 and operated by a variable speed driving mechanism 9 which also operates the sealing mechanism. The conveyor 7 comprises a pair of cooperating endless chains 11 and 13 having their inner runs in opposed relation. The chains 11 and 13 are supported on the exit end of the conveyor on sprocket wheels 15 and 17 which are rotatably mounted on subshafts 19 and 21 depending from the base 1. At the receiving end of the conveyor the chains 11 and 13 are supported on a pair of sprocket wheels 23 and 25 which are rotatably mounted on subshafts 27 and 29, depending from the base 1. This conveyor assembly 7 is adapted to convey the bags 5 through the sealing mechanism with the top marginal edges 6 of the bags in upstanding relation and with the opposite walls thereof flattened or brought together in closed relationship. FIGURE 10 shows the bags 5 supported between the chains 11 and 13 in the receiving end of the conveyor mechanism 7.

A pair of cutting edges 31 and 33 are arranged above the bag tops 6 and spaced inwardly of the receiving end of the machine. These cutting edges are mounted on a support means 35 and driven by the mechanism 37 whereby they are actuated to cut horizontally across the tops of the bags at a predetermined spaced distance above the upper edges of the chains 11 and 13 and thus trim the top of the marginal edges of the bags to provide a uniform top edge as the bag 5 is carried by conveyor 7 to the sealing mechanism 3. The waste material trimmed from the tops of the bags may be removed by any conventional means.

The top edges 6 are engaged and carried through the sealing mechanism 3 by a pair of cooperating endless bands 39 and 41 having their inner runs in opposed relation. The bands 39 and 41 are supported on the receiving end of the conveyor assembly 7 on pulleys 43 and 45 which are mounted on subshafts 47 and 49 depending from and rotatably supported in the base member 1. These bands have their inner faces 40 shaped in a concave manner as shown in FIGURE 9 in order to allow for the forming of the transition zone in the seal as described hereinabove. At the exit end of the conveyor assembly 7 the bands 39 and 41 are supported on a pair of pulleys 42 and 44 which are mounted on subshafts 55 and 57, depending from and rotatably supported in the base of the machine. The pulleys at either end may be driven by the power mechanism 9 which drives the conveyor mechanism 7.

The movement of the bands is coordinated with the movement of the conveyor assembly by sprockets 46 and 48 connected to shafts 55 and 57 respectively. These endless bands 39 and 41 are guided by a plurality of pressure bars 59 arranged on opposite sides of the bands 39 and 41 along the center line of the apparatus as shown in FIGURE 2. These pressure bars constitute part of the sealing mechanism 3 by which the bag tops are sealed together. The bands support the tops of the bags as they move through the plurality of pressure bars and hold these tops in gripping relation. The curvature of the band permits the pressure bars to work against the concave curved back side of the bands to roll or twist them in order to raise or lower the point at which the bands are nearest one another; however, the radius of curvature of the band surface is not changed. By controlling the location of this point and the temperature of the bands gripping the polyethylene material, the strength of the seal may be optimized. This sealing procedure will now be described in greater detail.

Referring to FIGURES 2-7, it will be noted that the pressure bars consist of a plurality of segments 61, 62, 63, and 64 disposed in spaced parallel relationship. The sealing mechanism may be made up of a plurality of segments such as is shown in FIGURES 1 and 2 or it may be one continuous segment as shown in FIGURE 8. These segments have a different cross section along their longitudinal length. FIGURE 3 denotes a cross section of that portion of edge 6 which is toward the receiving or inner end of the apparatus and which is shaped so that the bands 39 and 41 are nearest at their centers. This causes the bag top to be pinched together; however, as the bag reaches the segment 62 it will be noted that in FIGURE 4 its cross section is such that the bands are spaced more widely apart at their top and closest together near their bottom. However, the minimum space between the bands is always the same in all the segments. It will be noted that segments 62 and 63 have a heating element 65 in spaced relation above their upper edges. The heating element could extend over all or a portion of segments 61 and 64 if desired. This heating element causes the marginal edges of the tops of the bags to melt, forming a bead 67 along their tops. Since the top of the bands are progressively spaced more widely apart and then brought more closely together during the movement of the bag tops through the segments 62 and 63, the cross sectional thickness of the bead is first increased and then decreased by gradually diminishing the distance between the tops of the pressure bars 63 and 64. The softened material of the bead is caused to be squeezed very firmly together during the cooling stages thereof to insure a strong seal across the upper edges of the bag. It is to be understood that any desired means, easily within the province of the skilled mechanic, may be employed for regulating the speed with which the bags are conveyed through the sealing mechanisms 3. The variable speed motor 9 controls the rate with which the bags are advanced by the conveyor mechanism 7. It will also be understood that the pressure bars may be moved closer together or wider apart by any conventional means such as a screw means or the like, not shown, in accordance with the particular type and thickness of thermoplastic material being used to manufacture the bags.

Water at the desired temperature is circulated through the apertures 69 in the pressure bars 61, 62, 63 and 64. The timing and duration of the melting and cooling periods to suit the thickness and nature of the film to be sealed may first be determined by trial and error through operation of the apparatus, and then by adjusting the variable motor, until the appropriate timing has been found. If the sealing time is too short, of course, no sealing will take place, and if it is too long the shaping and cooling of the film by the band surfaces cannot compensate for the loss of orientation and strength. If the temperature is too low either no sealing would take place or the sealing time would be too long so that production is reduced. If the temperature is too high, the plastic material may degrade. If pressure is too low delamination may take place, and if too high the film may be thinned down excessively and weakened. Therefore, all of these variable factors have to be previously worked out by trial and error and a suitable parameter set for maintaining a specified distance between the parallel pressure bars, the length of the pressure bars and the length of time for which the heating and sealing operations are maintained.

While the mechanism is particularly adapted for sealing the bags formed of biaxial oriented polyethylene film material, it may be used for sealing bags of any material having similar melting or seam-forming characteristics. In the illustrated form of the machine the bags that are being sealed are carried along with the edges of the material to be sealed uppermost, but it will be understood that the mechanism may be otherwise arranged relative to the work. It may be positioned so that the work is carried on one side or above the mechanism. In the latter position the mechanism would merely be inverted.

In order to illustrate the operation of this continuous band sealing machine, the following examples are offered.

EXAMPLE I

Eighteen-inch lay-flat biaxial oriented blown tubing made from a 60 percent blend of solution polymer with a melt index of 5 and 40 percent particle form polyethylene, having a high load melt index (ASTM D 1238–57T Condition F) of 1, having a thickness of 3.5–4.5 mils, and having a tensile strength of 12,000 p.s.i. in both the machine and transverse directions, was sealed in accordance with the subject invention.

Tests strips were taken of this seal and pulled in a tensile tester whose clamping jaws moved apart at the rate of 20 inches/minute. The film failed at 12,000 p.s.i. without reaching the strength of the seals.

EXAMPLE II

Eighteen-by-thirty-inch bags were made from 1.5 mil 18-inch lay-flat biaxial oriented blown tubing made from solution polyethylene having a melt index of .2 and tensile strengths in the machine and transverse direction of 28,000 p.s.i. and 24,000 p.s.i., respectively.

Bags sealed by the method of this invention were filled with 44 pounds of plastic pellets and edge-dropped to place the maximum stress from impact across the seal. The seals did not fail from repeated drops from 11 feet to a concrete floor. Eventual failure was due to film tearing and was independent of the seal. Bags made from the same film but sealed by conventional means and subjected to the drop tests failed in the area adjacent the seal where orientation of the film had been destroyed by the sealing heat.

Table

Burst Test of P. E. Film:                             P.s.i.
   Unoriented film _____ 4,500
   Biaxially oriented film—conventional seal __ 5,000
   Biaxially oriented film and formed seal ____ 17,000

From the above it can be seen that by sealing thermoplastic material by the method and apparatus of this invention so as to provide a transition zone in the sealed portion of the film there is achieved an improved seal having a bursting strength considerably higher than that achieved by conventional techniques in the art.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method for the continuous closing and sealing of the tops of bags made of thermoplastic material clamped between support means comprising the steps of supporting the bags so that the top edges of the bags are in face-to-face relationship and extend a predetermined distance above the supporting means; passing the bags through a heating zone; increasing the distance between the tops of the support means and the outer surfaces of the top edges of the bags while the bags are being passed through the heating zone; diminishing the distance between the tops of the support means and controlling the temperature and shape of the tops of the bags whereby a transition zone is established through the seal.

2. A method for the continuous closing and sealing of the tops of bags made of thermoplastic material comprising the steps of passing between a series of pressure bars, disposed in spaced parallel relationship, top edges of the bags whereby they are in face-to-face relationship and extend a predetermined distance above the tops of the bars; directing heat onto at least one of the pressure bars so that the top edges of the bags passing therebetween are heated thereby causing a molten bead to build up and unite along the said top edges; increasing the distance between the tops of the pressure bars during the heating operations; diminishing the distance between the tops of the pressure bars and controlling the temperature and shape of the tops of the bags whereby a transition zone is established through the seal.

3. A method for the continuous closing and sealing of the tops of bags made of biaxial oriented polyethylene comprising the steps of placing the bags between a conveyor mechanism whereby the top edges of the bags are in face-to-face relationship; trimming the said edges so that they extend a predetermined distance above the conveyor mechanism; passing the bags between a series of pressure bars; directing radiant heat onto at least one of the pressure bars so that the marginal portions of the bags passing therebetween are heated causing a molten bead to build up and unite along the said top edges; increasing the distance between the outer surfaces of the top edges of the bags during the heating operation; diminishing the distance between the outer surfaces of the top edges of the bags; controlling the temperature and shape of the tops of the bags whereby a transition zone is established through the sealed area.

4. A method according to claim 3 including the step of controlling the speed of the bags as they pass between the pressure bars.

5. Apparatus for the continuous closing and sealing of the tops of bags composed of biaxial oriented thermoplastic material comprising conveyor means for continuously advancing a plurality of bags; guide means for holding the top edges of the bags in face-to-face relationship in substantial alignment; sealing means located in the path of said conveyor means and being adapted to direct the guide means to impart a divergence in the distance between the top edges of the bags during the heating thereof and to impart a convergence in the distance between the top edges of the bags during the cooling thereof, such divergence and convergence of the sealing means being sufficient to impart a transition zone to the formed seal; heating elements for heating said means.

6. An apparatus according to claim 5 wherein the sealing means comprises a single pressure bar.

7. Apparatus for the continuous closing and sealing of the tops of bags composed of biaxial oriented thermoplastic material comprising conveyor means for continuously advancing a plurality of bags; support means for holding the top edges of the bags in face-to-face relationship in substantial alignment; sealing means located in the path of said conveyor means and being adapted to direct the support means to impart a divergence in the distance between the outer surfaces of the top edges of the advancing bags during the heating thereof and to impart a convergence in the distance between the outer surfaces of the top edges of the advancing bags during the cooling thereof, such divergence and convergence in said sealing means being sufficient to impart a transition zone to the formed seal; trimming means for cutting the top edges of the tops of the bags a predetermined distance above the top of the conveyor means and means for supplying a cooling medium to said sealing means.

8. The apparatus of claim 7 wherein the sealing means comprises a plurality of pressure bars positioned in the path of said advancing bags in substantially spaced parallel relationship, said pressure bars being shaped such that their contiguous top edges diverge and then converge and the heating elements comprise an elongated tubular radiant heater so adapted as to rest adjacent to and above the portion of the pressure bars wherein the surfaces thereof are diverging.

9. The apparatus of claim 7 wherein the support means comprises a pair of curved bands having a concave side and a convex side wherein their concave sides are positioned substantially in abutment with the pressure bars.

10. Apparatus according to claim 9 further characterized by the provision of means adapted to coordinate the movement of said conveyor means with said curved bands.

References Cited

UNITED STATES PATENTS 2,679,469    5/1954    Bedford _____ 156—272
3,131,623    5/1964    Seefluth _____ 156—583

EARL M. BERGERT, *Primary Examiner.*

D. J. DRUMMOND, *Assistant Examiner.*